(12) United States Patent
Sekine et al.

(10) Patent No.: US 9,354,421 B2
(45) Date of Patent: May 31, 2016

(54) METHOD OF MANUFACTURING ADVANCED GRID STRUCTURE, ADVANCED GRID STRUCTURE, AND SPACE TELESCOPE USING ADVANCED GRID STRUCTURE

(71) Applicant: Mitsubishi Electric Corporation, Chiyoda-ku (JP)

(72) Inventors: Kazushi Sekine, Tokyo (JP); Michihito Matsumoto, Tokyo (JP); Masami Kume, Tokyo (JP); Hajime Takeya, Tokyo (JP); Hirotsugu Morinaga, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 35 days.

(21) Appl. No.: 14/067,057

(22) Filed: Oct. 30, 2013

(65) Prior Publication Data

US 2014/0049814 A1     Feb. 20, 2014

Related U.S. Application Data

(62) Division of application No. 13/548,896, filed on Jul. 13, 2012, now Pat. No. 8,821,670.

(30) Foreign Application Priority Data

Aug. 5, 2011   (JP) .................................. 2011-171731
Oct. 28, 2011  (JP) .................................. 2011-236650
May 24, 2012   (JP) .................................. 2012-118727

(51) Int. Cl.
*G02B 7/18*     (2006.01)
*G02B 7/00*     (2006.01)
(Continued)

(52) U.S. Cl.
CPC .............. *G02B 7/181* (2013.01); *B29C 70/202* (2013.01); *B29C 70/207* (2013.01); *G02B 5/09* (2013.01);
(Continued)

(58) Field of Classification Search
CPC ............... Y10T 428/24124; Y10T 428/24074; G02B 7/008; G02B 5/09
USPC ................................................... 428/113, 105
See application file for complete search history.

(56) References Cited

U.S. PATENT DOCUMENTS 4,385,952 A     5/1983   Futakuchi et al.
7,993,727 B2    8/2011   Sekine et al.
(Continued)

FOREIGN PATENT DOCUMENTS

EP      1 995 040 A1    11/2008
FR      2 918 309 A1    1/2009
JP      04-041889       7/1992

OTHER PUBLICATIONS

French Preliminary Search Report and Written Opinion issued Feb. 4, 2014, in Patent Application No. 1257570 with English translation of category of cited documents.

*Primary Examiner* — Brent O'Hern
(74) *Attorney, Agent, or Firm* — Oblon, McClelland, Maier & Neustadt, L.L.P.

(57) ABSTRACT

Provided is an advanced grid structure manufactured by a lamination step of laminating a first tape prepreg group, a second tape prepreg group, and a third tape prepreg group repeatedly in the stated order on a forming die, in which grooves (2, 3, 4) in a lattice shape are formed in three directions, so as to provide crossing regions (7, 8, 9) in which two tape prepreg groups overlap each other, and a heating forming step of forming a laminate by heating under pressure. In the lamination step, the first tape prepreg group, the second tape prepreg group, and the third tape prepreg group are respectively laminated as one layer in crossing regions (7, 8, 9) so that a tape width is maintained, and laminated in non-crossing regions (2*a*, 3*a*, 4*a*) in a state of being folded as two layers in a width direction thereof.

10 Claims, 9 Drawing Sheets

(51) Int. Cl.
  *G02B 7/183* (2006.01)
  *G02B 5/09* (2006.01)
  *G02B 23/06* (2006.01)
  *B29C 70/20* (2006.01)
  *G02B 23/02* (2006.01)

(52) U.S. Cl.
  CPC ............... *G02B 7/008* (2013.01); *G02B 7/183* (2013.01); *G02B 23/02* (2013.01); *G02B 23/06* (2013.01); *Y10T 156/10* (2015.01); *Y10T 156/1002* (2015.01); *Y10T 156/1043* (2015.01); *Y10T 156/1049* (2015.01); *Y10T 428/139* (2015.01); *Y10T 428/1352* (2015.01); *Y10T 428/24074* (2015.01); *Y10T 428/24124* (2015.01)

(56) References Cited

U.S. PATENT DOCUMENTS

| | | |
|---|---|---|
| 2004/0136101 A1 | 7/2004 | Warren |
| 2006/0181794 A1 | 8/2006 | Warren |
| 2009/0011175 A1 | 1/2009 | Sekine et al. |
| 2009/0065977 A1 | 3/2009 | Suzuki et al. |
| 2012/0175049 A1 | 7/2012 | Suzuki et al. |

METHOD OF MANUFACTURING ADVANCED GRID STRUCTURE, ADVANCED GRID STRUCTURE, AND SPACE TELESCOPE USING ADVANCED GRID STRUCTURE

CROSS REFERENCE TO RELATED APPLICATIONS

This application is a division of U.S. application Ser. No. 13/548,896 filed Jul. 13, 2012, issued as U.S. Pat. No. 8,821,670, the entire contents of which is incorporated herein by reference. U.S. application Ser. No. 13/548,896 is based upon and claims the benefit of priority from prior Japanese Patent Application Nos. 2011-171731 filed Aug. 5, 2011, 2011-236650 filed Oct. 28, 2011, and 2012-118727 filed May 24, 2012.

BACKGROUND OF THE INVENTION

1. Field of the Invention

The present invention relates to a light-weight advanced grid structure having low thermal expansion characteristics, which is obtained by using carbon fiber reinforced plastic serving as an aerospace material which is lighter than metal and has a low thermal expansion coefficient, and to a method of manufacturing the advanced grid structure and a space telescope using the advanced grid structure.

2. Description of the Related Art

In recent years, in various fields, there has been an increasing demand for high-resolution satellite images of objects in an aerospace and on the earth. Along with this, there has been a demand for development of an observation satellite having mounted thereon a telescope having a resolution higher than that of a conventional telescope.

In order to enhance the resolution of a telescope in such a satellite, it is necessary not only to enlarge a mirror but also to provide a light-weight mirror barrel structure having a low thermal expansivity for holding a large mirror thermally stably. This is because, when thermal dimensional stability is low in the case where a temperature distribution occurs in a telescope structure in a space environment, the structure is distorted, which results in a decrease in a resolution of a satellite image. Thus, it is important to realize a mirror barrel structure having a low thermal expansivity.

Further, the weight of a telescope, that is, the weight of a satellite increases along with the enlargement of a mirror. However, there is a limit to a load capacity because the satellite is set off with a rocket. Thus, it is also necessary to reduce weight of the mirror barrel structure.

As a mirror barrel structure that satisfies both the low thermal expansivity and the light weight, a cylindrical advanced grid structure has been proposed. In the cylindrical advanced grid structure, carbon fibers are oriented in a lattice shape in a cylindrical plane in a direction parallel to a cylinder axis direction and in a direction forming an angle of ±60° with respect to the cylinder axis direction. Such a cylindrical advanced grid structure has a low thermal expansivity in the cylinder axis direction and is light weight. Further, as a method of manufacturing such an advanced grid structure, there is generally known a method of forming an advanced grid structure by placing cores made of rubber or metal for forming a lattice on a forming die and laminating tape-shaped prepregs between the cores.

In the case where the core is made of rubber, a prepreg having a width larger than a desired rib width is laminated, and a forming pressure is applied to the prepreg by thermal expansion of the rubber and expansion of the rubber in an in-plane direction of the rubber, which is caused by the pressure from an out-of-plane direction, to thereby form the advanced grid structure into a desired dimension (for example, see S. M. Huybrechts and three others, "Manufacturing theory for advanced grid stiffened structure", Composites: Part A33 (2002) 155-161).

On the other hand, in the case where the core is made of metal, a gap of the same dimension as a desired rib width is formed with use of the core, and the gap is filled with fibers and a resin so that a desired dimension is obtained (for example, see Japanese Examined Patent Publication No. Hei 4-41889).

However, the prior art has the following problems.

In S. M. Huybrechts and three others, "Manufacturing theory for advanced grid stiffened structure", Composites: Part A33 (2002) 155-161, silicon rubber is used as a core made of rubber. The linear expansion coefficient of silicon rubber is very large (i.e., 200 ppm/K) and silicon rubber expands more greatly by heating during formation, compared with metal. Further, silicon rubber has a lower coefficient of elasticity compared with metal, and hence, even when the same forming pressure is applied to silicon rubber in an out-of-plane direction, a displacement amount of silicon rubber is larger than that of metal, and a displacement amount of silicon rubber in an in-plane direction ascribed to a Poisson ratio is also larger than that of metal.

The forming pressure in the in-plane direction is applied to the prepreg due to the above-mentioned thermal and mechanical expansion in the in-plane direction, and the dimension of the rib width is determined by the expansion amount of silicon rubber. The expansion amount of silicon rubber is determined by a temperature difference from room temperature and the forming pressure. Therefore, in order to obtain a desired forming accuracy, it is necessary to maintain a uniform temperature and forming pressure to be applied in all the cores.

However, in general, it is very difficult to maintain a uniform forming condition in all the cores, and the expansion amount varies depending also upon the dimensional accuracy of the core. Therefore, it is very difficult to obtain a desired forming accuracy through use of the core made of rubber.

On the other hand, in Japanese Examined Patent Publication No. Hei 4-41889, the problem of forming accuracy is solved by using a core made of metal. The thermal and mechanical deformation of metal is small, and hence, the dimension of the core does not change significantly during a formation process. Therefore, a gap formed by the forming die and the core is filled with fibers and a resin so that a desired dimension is obtained.

Herein, the advanced grid structure has a region in which ribs oriented in different directions cross each other. Then, in the case where fibers are laminated continuously with respect to one rib, in the region in which the ribs cross each other, in a lamination direction (thickness direction), the amount of carbon fibers becomes twice as large as the amount in a region in which the ribs do not cross each other. Thus, unevenness of a rib thickness or bending of fibers is caused by the difference in the amount of fibers, which results in a breakage point of a formed article.

In order to solve the above-mentioned problem, in Japanese Examined Patent Publication No. Hei 4-41889, prepregs are laminated with the shape separated in a plurality of patterns so that the amount of carbon fibers in the thickness direction is maintained uniform. However, in Japanese Examined Patent Publication No. Hei 4-41889, the prepregs are laminated with the shape separated in a plurality of patterns as described above, and hence, the fibers are not continuous with respect to one rib. Therefore, the original mechanical and thermal characteristics of the grid structure may not be exhibited.

In the cylindrical advanced grid structure, the thermal expansion coefficient in the cylinder axis direction is optimized by the area of the crossing region and the curvature of the cylinder, and the weight is optimized by the number of laminated prepregs. In order to realize a cylindrical advanced grid structure obtained by optimum design, it is necessary to form the cylindrical advanced grid structure so as to have the dimension and amount of carbon fibers with good accuracy as designed.

SUMMARY OF THE INVENTION

The present invention has been made so as to solve the above-mentioned problems, and an object of the present invention is to provide a method of manufacturing an advanced grid structure, which is capable of ensuring both a dimensional accuracy and a uniform amount of carbon fibers in a thickness direction within a desired range without laminating prepregs with a shape separated in a plurality of patterns, and to provide an advanced grid structure and a space telescope using the advanced grid structure.

According to an exemplary embodiment of the present invention, there is provided a method of manufacturing an advanced grid structure, including: preparing a forming die made of a metal, in which a lattice-shaped groove is formed in three directions; laminating a first tape prepreg group, a second tape prepreg group, and a third tape prepreg group repeatedly in the stated order on the forming die so as to provide crossing regions, in each of which two of the first tape prepreg group, the second tape prepreg group, and the third tape prepreg group overlap each other, the first tape prepreg group, the second tape prepreg group, and the third tape prepreg group each including reinforced fibers continuously in a longitudinal direction thereof; and forming the first tape prepreg group, the second tape prepreg group, and the third tape prepreg group by heating under pressure. The lattice-shaped groove of the prepared forming die is formed so that the crossing regions, in each of which two different tape prepreg groups overlap each other, are brought into contact with each other and gathered at one place, and is further formed so as to have a width smaller than a tape width in non-crossing regions, in each of which one tape prepreg group is laminated without crossing another tape prepreg group. The laminating includes: laminating, in each of the crossing regions, the two of the first tape prepreg group, the second tape prepreg group, and the third tape prepreg group in an overlapping manner without being folded so that the tape width is maintained, and laminating, in each of the non-crossing regions, in part of the lattice-shaped groove which is narrower than the tape width, one of the first tape prepreg group, the second tape prepreg group, and the third tape prepreg group in a state of being folded as two layers in a width direction thereof.

Further, according to another exemplary embodiment of the present invention, there is provided an advanced grid structure made of a fiber reinforced resin, the advanced grid structure including: a plurality of tape groups each including reinforced fibers extending in a longitudinal direction thereof, the plurality of tape groups overlapping each other into a lattice shape, the plurality of tape groups including a first tape group, a second tape group, and a third tape group extending in different longitudinal directions, the first tape group, the second tape group, and the third tape group being laminated in an overlapping manner repeatedly in the stated order to form a grid; crossing regions, in each of which two tape groups overlap each other; a lattice formed so that the crossing regions formed of two different tape groups are brought into contact with each other; and non-crossing regions each provided between the crossing regions, in which one tape group is laminated without overlapping another tape group, and a tape is folded in a thickness direction to be laminated so that a thickness obtained by overlapping the two tape groups in each of the crossing regions is equal to a thickness obtained by folding one tape in each of the non-crossing regions.

According to the present invention, it is possible to obtain the method of manufacturing an advanced grid structure, which is capable of ensuring, by laminating each tape prepreg as one layer in the crossing regions so that the tape width is maintained and laminating the tape prepreg in the non-crossing regions in the state of being folded as two layers in the width direction thereof, both the dimensional accuracy and the uniform amount of carbon fibers in the thickness direction in the desired range without laminating prepregs with the shape separated in a plurality of patterns, and to obtain the advanced grid structure and the space telescope using the advanced grid structure.

DETAILED DESCRIPTION OF THE PREFERRED EMBODIMENTS

First Embodiment

According to a method of manufacturing an advanced grid structure of a first embodiment of the present invention, a prepreg is used, which is produced by, for example, impregnating carbon fibers with a resin, and thereafter, semi-curing the carbon fibers. Further, this manufacturing method includes the steps of laminating, on a forming die, a band-shaped tape prepreg formed of a prepreg made of a heat-curable resin, such as an epoxy resin, reinforced with fibers by orienting carbon fibers in a longitudinal direction, and heating the tape prepreg under pressure.

As the carbon fibers, carbon fibers which have a tensile elasticity modulus of 280 GPa or more and 950 GPa or less are used. Examples of the carbon fibers include TORAYCA (trademark) carbon fibers T800HB produced by Toray Industries, Inc., TORAYCA (trademark) carbon fibers M55J produced by Toray Industries, Inc., and DIALEAD (trademark) carbon fibers K13C2U produced by Mitsubishi Plastics, Inc.

Next, the terms used in the description of this embodiment are described.

The term "advanced grid structure" according to this embodiment refers to a truss structure formed by laminating a band-shaped tape prepreg formed of a prepreg made of a heat-curable resin reinforced with fibers by orienting carbon fibers in a longitudinal direction and heating the tape prepreg under pressure, through use of a prepreg produced by impregnating carbon fibers with a resin and semi-curing the carbon fibers.

Further, the term "tape prepreg" refers to a tape-shaped material in a semi-cured state, which is produced by impregnating a plurality of united carbon fibers with a resin.

Further, the term "lattice-shaped groove" refers to a groove in a lattice shape formed by placing cores on a forming die for an advanced grid structure, which is described later in detail.

Figure 1:
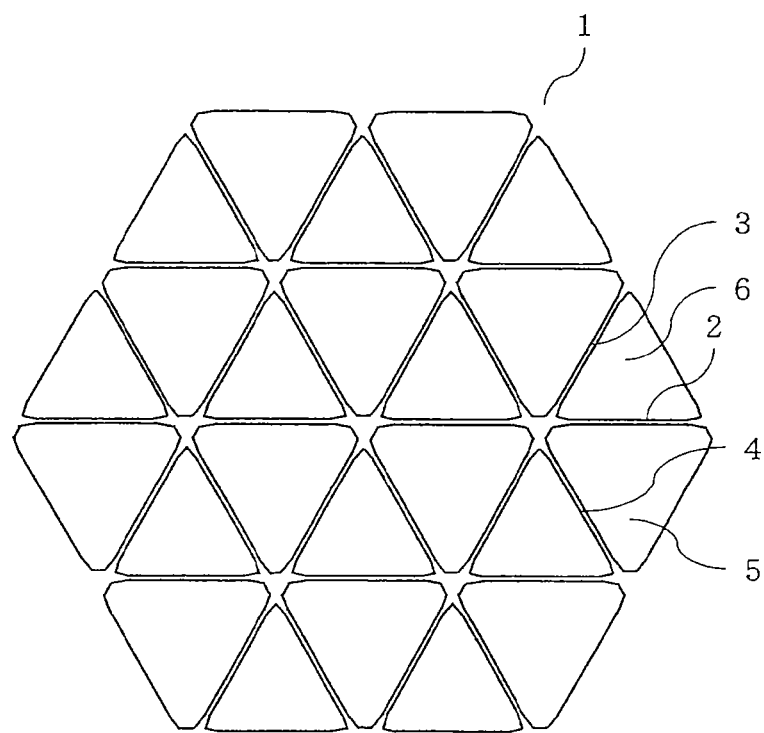
FIG. 1 is a top view of a forming die to be used in one example of a method of manufacturing an advanced grid structure according to a first embodiment of the present invention.

FIG. 1 is a top view of a forming die to be used in one example of the method of manufacturing an advanced grid structure according to the first embodiment of the present invention. A forming die 1 illustrated in FIG. 1 is formed of a first groove group 2, a second groove group 3, a third groove group 4, large cores 5, and small cores 6. According to the method of manufacturing an advanced grid structure of the first embodiment, a tape prepreg is laminated on a lattice-shaped groove (corresponding to the first groove group 2, the second groove group 3, and the third groove group 4) of the forming die 1 illustrated in FIG. 1.

Herein, the first groove group 2, the second groove group 3, and the third groove group 4 of the forming die 1 are as follows.

First groove group 2: a plurality of lattice-shaped grooves whose longitudinal direction in FIG. 1 is directed horizontally on the drawing sheet and which are arranged in parallel at regular intervals in a first direction orthogonal to the longitudinal direction (in the following description, each groove constituting the first groove group is referred to as a 0-degree direction groove 2).

Second groove group 3: a plurality of lattice-shaped grooves which cross the 0-degree direction grooves 2 so as to be inclined at an angle of 60° in a clockwise direction and which are arranged in parallel at regular intervals (in the following description, each groove constituting the second groove group is referred to as a +60-degree direction groove 3).

Third groove group 4: a plurality of lattice-shaped grooves which cross the 0-degree direction grooves 2 so as to be inclined at an angle of 60° in a counterclockwise direction and which are arranged in parallel at regular intervals (in the following description, each groove constituting the third groove group is referred to as a −60-degree direction groove 4).

In the forming die 1 to be used in the method of manufacturing an advanced grid structure according to the first embodiment, the 0-degree direction grooves 2, the +60-degree direction grooves 3, and the −60-degree direction grooves 4 are formed by the large cores 5 and the small cores 6 placed on the forming die 1. In FIG. 1, the large core 5 is a core in which one apex of a substantially triangular shape is directed downward on the drawing sheet, and the small core 6 is a core in which one apex of a substantially triangular shape is directed upward on the drawing sheet.

The arrangement in FIG. 1 is described more specifically. The large cores 5 and the small cores 6 which are smaller than the large cores 5 are arranged alternately, and are arranged so as to have, as a basic configuration, a hexagonal shape formed by gathering each one apex of the three large cores 5 and the three small cores 6 at one node point. With such an arrangement, the lattice-shaped groove in three directions (corresponding to 0-degree direction groove 2, +60-degree direction groove 3, and −60-degree direction groove 4) is formed.

Materials for the large core 5 and the small core 6 may have a low thermal expansion coefficient that is about 1/10 of that of silicon rubber. Further, the large core 5 and the small core 6 may be integrated as a part of the forming die 1 or may be separated therefrom.

In the first embodiment, the forming die 1 made of aluminum is used considering productivity of the forming die 1, and the forming die 1 is separated from the large cores 5 and the small cores 6. In the case where the forming die 1 is separated from the large cores 5 and the small cores 6, the forming die 1 has a flat shape, and the forming die 1, the large cores 5, and the small cores 6 have a mechanism for fixing the positions thereamong, for example, a pin hole for inserting a positioning pin.

Figure 2:
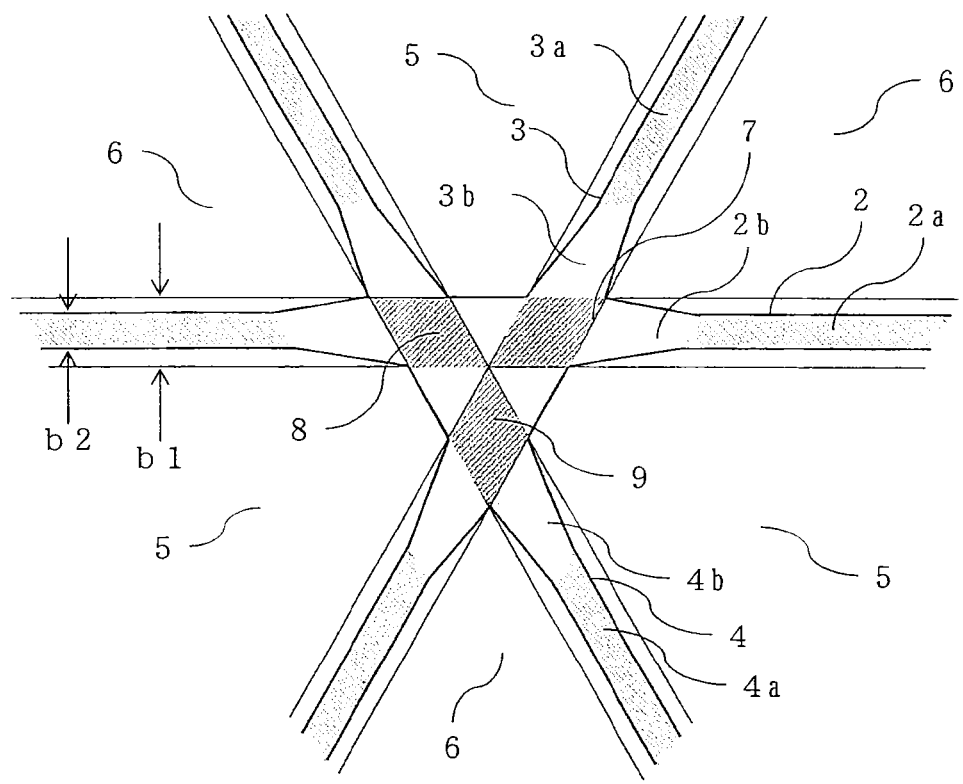
FIG. 2 is an enlarged view including one node point of the forming die to be used in the method of manufacturing an advanced grid structure according to the first embodiment of the present invention.

FIG. 2 is an enlarged view including one node point of the forming die 1 to be used in the method of manufacturing an advanced grid structure according to the first embodiment of the present invention. As illustrated in FIG. 2, the 0-degree direction groove 2 crosses the +60-degree direction groove 3 and the −60-degree direction groove 4 in a first crossing region 7 and a second crossing region 8, respectively.

Similarly, the +60-degree direction groove 3 crosses the 0-degree direction groove 2 and the −60-degree direction groove 4 in the first crossing region 7 and a third crossing region 9, respectively, and the −60-degree direction groove 4 crosses the 0-degree direction groove 2 and the +60-degree direction groove 3 in the second crossing region 8 and the third crossing region 9, respectively. The width of each crossing region is b1.

A region of the 0-degree direction groove 2, which does not cross the +60-degree direction groove 3 and the −60-degree direction groove 4, includes a 0-degree direction non-crossing region 2a sandwiched by parallel opposing side surfaces of the side surfaces of the large core 5 and the small core 6 adjacent to each other, and a 0-degree direction tapered region 2b sandwiched by side surfaces which do not face each other.

Further, a region of the +60-degree direction groove 3, which does not cross the 0-degree direction groove 2 and the −60-degree direction groove 4 includes a +60-degree direction non-crossing region 3a sandwiched by side surfaces facing each other in parallel of the side surfaces of the large core 5 and the small core 6 adjacent to each other, and a +60-degree direction tapered region 3b sandwiched by side surfaces which do not face each other.

Further, a region of the −60-degree direction groove 4, which does not cross the 0-degree direction groove 2 and the +60-degree direction groove 3 includes a −60-degree direction non-crossing region 4a sandwiched by side surfaces facing each other in parallel of the side surfaces of the large core 5 and the small core 6 adjacent to each other, and a −60-degree direction tapered region 4b sandwiched by side surfaces which do not face each other.

The width of each non-crossing region (2a, 3a, 4a) is b2, which is a half value of b1. Further, the width of each tapered region (2b, 3b, 4b) changes continuously from the width b2 of the non-crossing region to the width b1 of the crossing region, as illustrated in FIG. 2.

In other words, the following features can be obtained by, as illustrated in FIG. 2, processing the shape of each apex of the large core 5 and the small core 6, and alternately arranging the large cores 5 and the small cores 6 at an appropriate interval.

(Feature 1) The large cores 5 and the small cores 6 are arranged at the interval b2 so that, in each non-crossing region (2a, 3a, 4a) in which one side of the large core 5 and one side of the small core 6 face each other, it is easy to laminate each of a first tape prepreg group, a second tape prepreg group, and a third tape prepreg group in a state of being folded as two layers in the width direction.

(Feature 2) The large cores 5 and the small cores 6 are arranged so that, in the crossing region (7, 8, 9), two tape prepreg groups of the first tape prepreg group, the second tape prepreg group, and the third tape prepreg group can be laminated so as to overlap each other, while maintaining the tape width b1 and without being folded, and the shape of each apex of the large cores 5 and the small cores 6 is processed so that the tapered regions (2b, 3b, 4b) are formed in which the tape width continuously changes from b1 to b2 or from b2 to b1.

Figure 3:
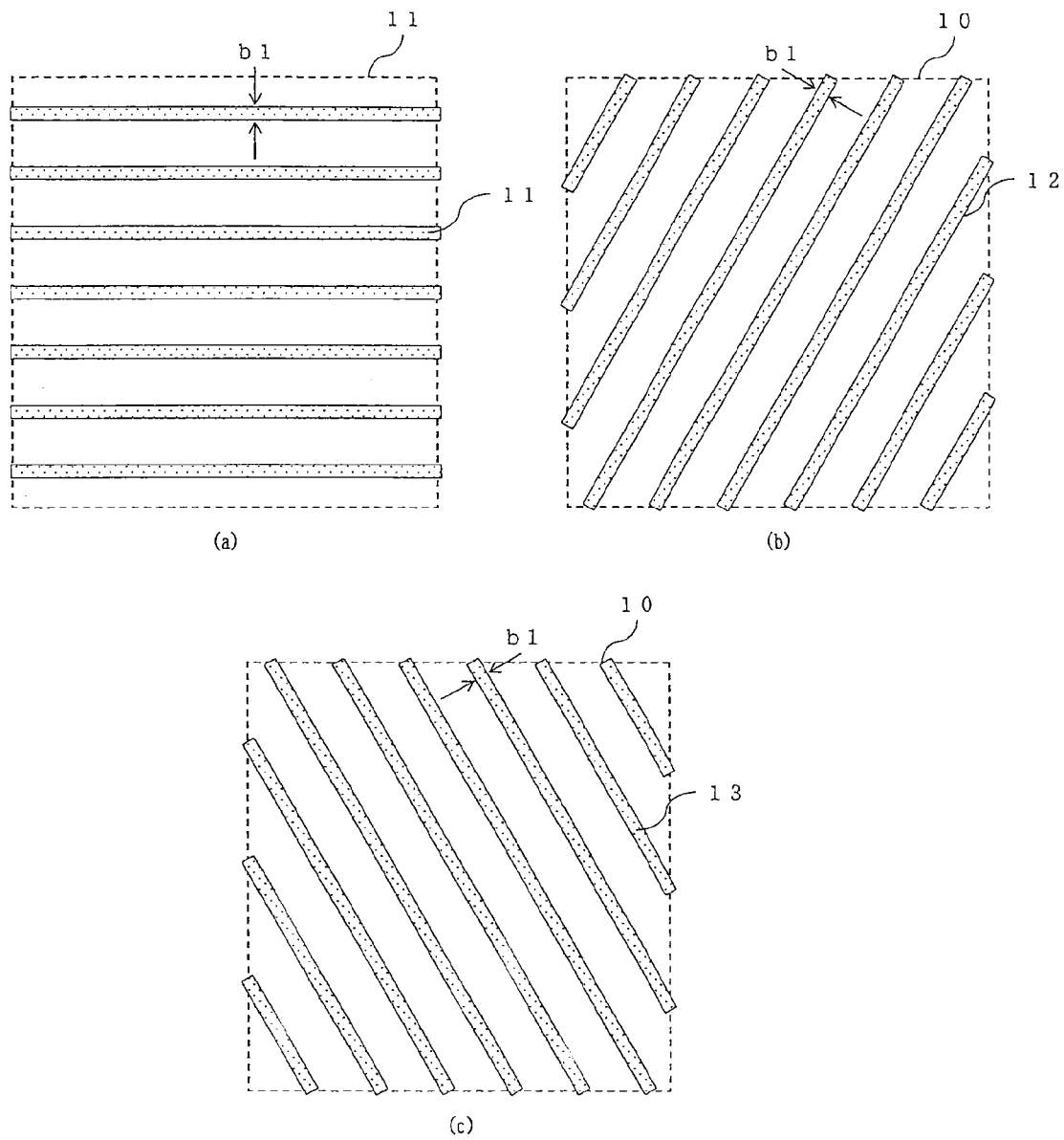
FIGS. 3A to 3C are plan views of a tape prepreg to be used in the method of manufacturing an advanced grid structure according to the first embodiment of the present invention.

Next, a manufacturing method using a prepreg is described as one example of the method of manufacturing an advanced grid structure according to the first embodiment. FIGS. 3A to 3C are plan views of a tape prepreg used in the method of manufacturing an advanced grid structure according to the first embodiment of the present invention.

First, a band-shaped tape prepreg having a width b1 is prepared, in which carbon fibers are oriented in a longitudinal direction (horizontal direction on the drawing sheet of FIG. 3A), through use of carbon fibers having a tensile elasticity modulus of 500 GPa or more and 600 GPa or less, for example, TORAYCA (trademark) carbon fibers M55J produced by Toray Industries, Inc. and an epoxy resin material.

A 0-degree direction carbon fiber tape prepreg 11, in which carbon fibers are oriented in parallel to a reference side 10 as illustrated in FIG. 3A, is laminated on the 0-degree direction groove 2 of the forming die 1. When the 0-degree direction carbon fiber tape prepreg 11 is laminated on the 0-degree direction non-crossing region 2a, a tape prepreg having a width b1 is folded in half in the width direction and laminated with the width b2, and in the first crossing region 7 and the second crossing region 8, the 0-degree direction carbon fiber tape prepreg 11 is laminated with the original width b1 without being folded.

Further, in the 0-degree direction tapered region 2b, the tape prepreg is laminated while being folded gradually in the width direction or being opened gradually from a folded state so that the first crossing region 7 and the second crossing region 8 are connected continuously to the 0-degree direction non-crossing region 2a.

A +60-degree direction carbon fiber tape prepreg 12 in which carbon fibers are oriented so as to be inclined at an angle of +60° in a counterclockwise direction with respect to the reference side 10 as illustrated in FIG. 3B is laminated on the +60-degree direction groove 3 of the forming die 1, and a −60-degree direction carbon fiber tape prepreg 13 in which carbon fibers are oriented so as to be inclined at an angle of 60° in a clockwise direction with respect to the reference side 10 as illustrated in FIG. 3C is similarly laminated on the −60-degree direction groove 4 of the forming die 1.

More specifically, the tape prepreg having the width b1 is folded in half in the width direction to be laminated with the width b2 when being laminated on the +60-degree direction non-crossing region 3a and the −60-degree direction non-crossing region 4a, and the tape prepreg is laminated with the original width b1 without being folded in each crossing region. Further, in the +60-degree direction tapered region 3b and the −60-degree direction tapered region 4b, the tape prepreg is laminated while being folded gradually in the width direction or being opened gradually from a folded state, in the same way as in the 0-degree direction tapered region 2b.

An advanced grid structure is manufactured by laminating the tape prepreg on each lattice-shaped groove of the forming die 1 a plurality of times and heating the tape prepreg under pressure in accordance with the above-mentioned procedure.

As described above, according to the first embodiment, in the crossing region, each tape prepreg is laminated as one layer so that the tape width is maintained, and in the non-crossing region, each tape prepreg is laminated in a state of being folded as two layers in the width direction. Thus, the amount of carbon fibers in the thickness direction can be kept uniform. As a result, in a light-weight advanced grid structure having low thermal expansion characteristics in which a thermal expansion coefficient in a cylinder axis direction is in a range of −0.1 ppm/K to +0.1 ppm/K, both the dimensional accuracy and the uniformity of the amount of carbon fibers in the thickness direction are ensured within desired ranges.

Second Embodiment

A method of manufacturing an advanced grid structure according to a second embodiment of the present invention is different from the above-mentioned method of manufacturing an advanced grid structure according to the first embodiment in that the shape of a forming die to be used in the second embodiment has a circular shape unlike the forming die used in the first embodiment. Note that, the remaining components are the same although the shape of a forming die is different, and the same components are denoted by the same reference symbols and the descriptions thereof are omitted.

Figure 4:
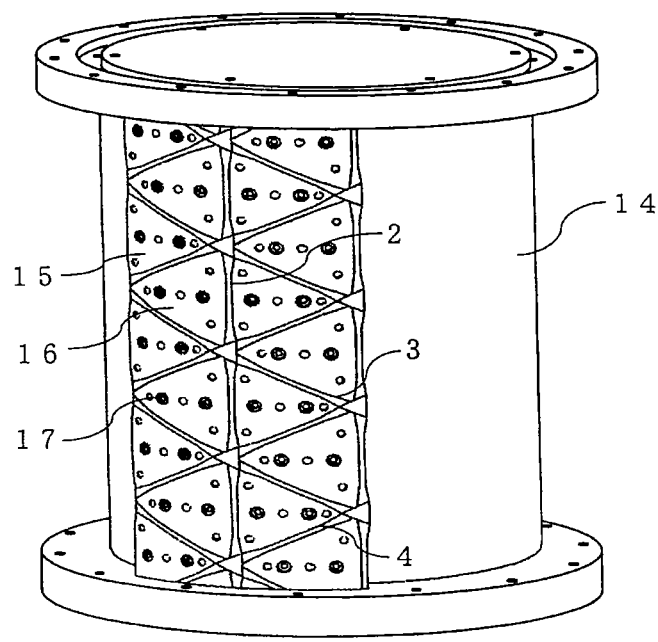
FIG. 4 is a perspective view of a circular forming die to be used in a method of manufacturing an advanced grid structure according to a second embodiment of the present invention.

FIG. 4 is a perspective view of a circular forming die to be used in the method of manufacturing an advanced grid structure according to the second embodiment of the present invention. A cylindrical forming die 14 illustrated in FIG. 4 has a cylindrical surface and includes positioning pin holes 17 for fixing cylindrical surface large cores 15 and cylindrical surface small cores 16. The cylindrical surface large cores 15 and the cylindrical surface small cores 16 having a curvature equal to that of the cylindrical forming die 14 are fixed to the cylindrical forming die 14 via positioning pins 17a.

In the second embodiment, each direction groove of the 0-degree direction groove 2, the +60-degree direction groove 3, and the −60-degree direction groove 4 is formed as a region sandwiched by the cylindrical surface large core 15 and the cylindrical surface small core 16 by fixing the cylindrical surface large core 15 and the cylindrical surface small core 16 to the cylindrical forming die 14.

Next, the above-mentioned tape prepregs illustrated in FIGS. 3A to 3C are laminated on the respective direction grooves formed on the cylindrical forming die 14. At this time, the reference side 10 is parallel to the cylinder axis direction (vertical direction on the drawing sheet of FIG. 4) of the cylindrical forming die 14. The subsequent procedure is the same as that of the above-mentioned first embodiment.

As described above, according to the second embodiment, a cylindrical advanced grid structure can be obtained, in which both the dimensional accuracy and the uniformity of the amount of carbon fibers in the thickness direction are ensured within desired ranges, by using a cylindrical forming die in which cylindrical surface large cores and cylindrical small cores are arranged.

Third Embodiment

Figure 5:
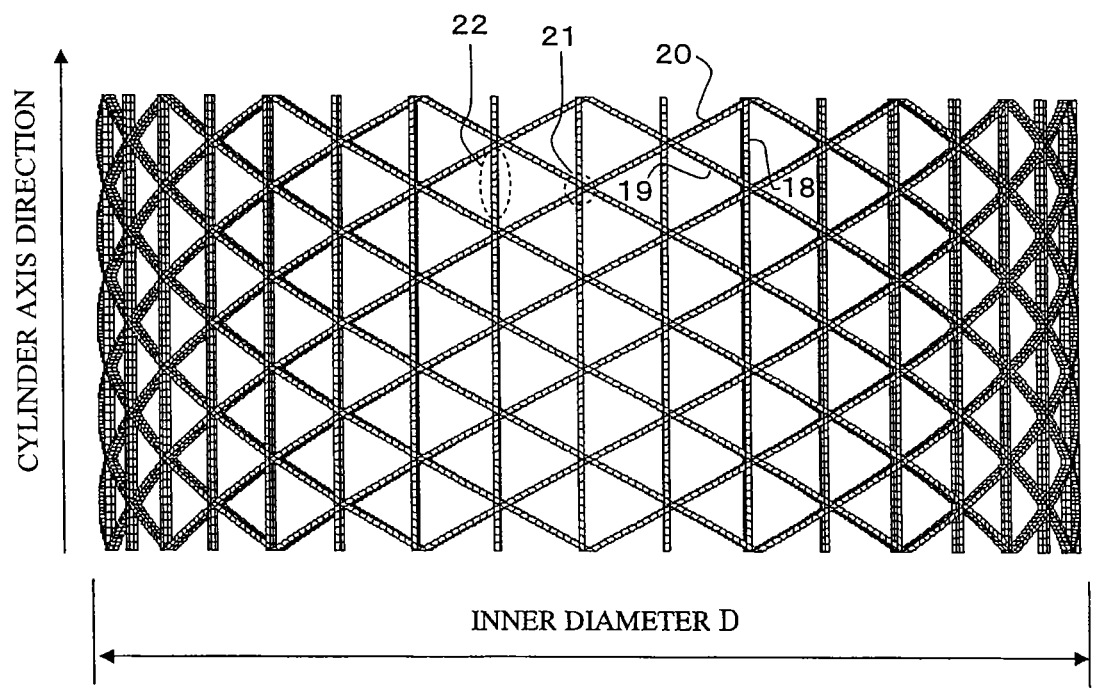
FIG. 5 is a front view of a cylindrical advanced grid structure according to a third embodiment of the present invention.

A configuration of a cylindrical advanced grid structure according to a third embodiment of the present invention is described with reference to FIGS. 5 to 7. FIG. 5 is a front view of the cylindrical advanced grid structure according to the third embodiment of the present invention, and an upward arrow in the figure indicates a cylinder axis direction. The cylindrical advanced grid structure of the present invention is formed of a combination of a plurality of first columnar structural members 18 made of carbon fiber reinforced plastic in which the cylinder axis direction is a major axis direction and a carbon fiber axis direction, a plurality of second columnar structural members 19 made of carbon fiber reinforced plastic in which a direction rotated by 60° in a counterclockwise direction from the cylinder axis direction is a major axis direction and a carbon fiber axis direction, and a plurality of third columnar structural members 20 made of carbon fiber reinforced plastic in which a direction rotated by 60° in a clockwise direction from the cylinder axis direction is a major axis direction and a carbon fiber axis direction, and forms a cylindrical structure having an inner diameter D. The first to third columnar structural members 18, 19, and 20 are arranged in a net shape as illustrated in FIG. 1 and formed of crossing portions 21, each being a collection of connection portions (corresponding to the first crossing region 7, the second crossing region 8, and the third crossing region 9 in FIG. 2) in which two columnar structural members cross each other to be connected, and rib portions 22 (corresponding to the 0-degree direction non-crossing region 2a, the +60-degree direction non-crossing region 3a, and the −60-degree direction non-crossing region 4a) in which the respective columnar structural members do not cross each other.

More specifically, the first columnar structural members 18, the second columnar structural members 19, and the third columnar structural members 20 in the third embodiment and the subsequent embodiments respectively correspond to laminated structures of the 0-degree direction carbon fiber tape prepreg 11 (first tape group), the +60-degree direction carbon fiber tape prepreg 12 (second tape group), and the −60-degree direction carbon fiber tape prepreg 13 (third tape group) in the above-mentioned first and second embodiments.

Figure 6:
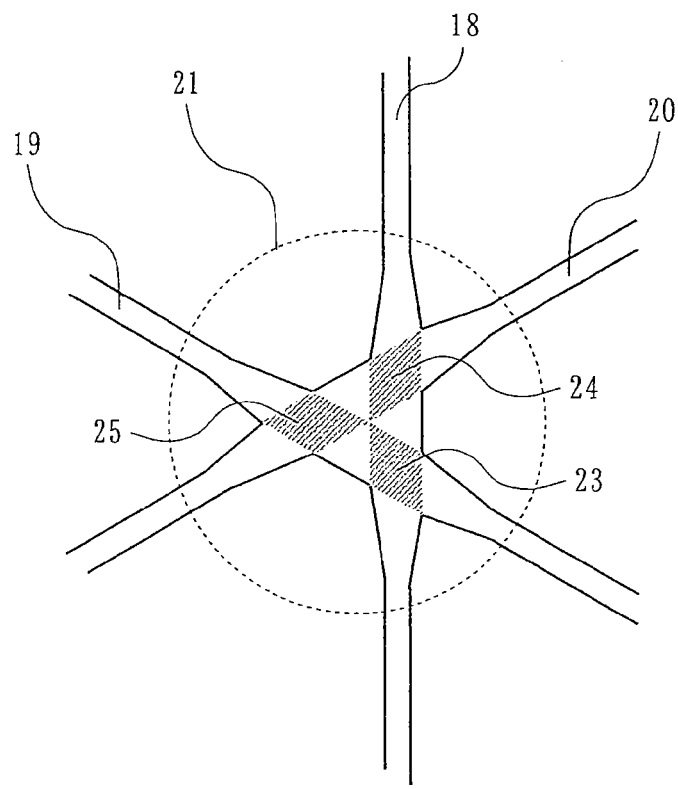
FIG. 6 is an enlarged view of a crossing portion of the cylindrical advanced grid structure according to the third embodiment of the present invention.

FIG. 6 is an enlarged view of the crossing portion 21 of the cylindrical advanced grid structure according to the third embodiment of the present invention. Hatched regions of FIG. 6 indicate connection portions in which two columnar structural members cross each other to be connected. A connection portion 23 of the first columnar structural member 18 and the second columnar structural member 19, a connection portion 24 of the first columnar structural member 18 and the third columnar structural member 20, and a connection portion 25 of the second columnar structural member 19 and the third columnar structural member 20 are formed, and the three connection portions 23, 24, and 25 form the crossing portion 21.

The connection portions 23, 24, and 25 each have a laminated structure of a plurality of carbon fiber layers, the carbon fiber axis directions of which are major axis directions of two columnar structural members forming each of the connection portions 23, 24, and 25. For example, the connection portion 23 is formed of the first columnar structural member 18 and the second columnar structural member 19, and the connection portion 23 has a laminated structure of a plurality of two kinds of carbon fiber layers, the carbon fiber axis directions of which are respective major axis directions of the first columnar structural member 18 and the second columnar structural member 19. The connection portions 23, 24, and 25 have a structure in which a plurality of carbon fiber layers in two directions are laminated, and hence, have sufficient strength for maintaining a cylindrical structure with respect to a stress from outside.

In the third embodiment, the respective connection portions 23, 24, and 25 are configured so as to come into contact with each other at the center thereof and have no gap at the center of each of the connection portions 23, 24, and 25. The cylindrical advanced grid structure of the third embodiment includes the crossing portion 21 formed of the connection portions 23, 24, 25, and the rib portion 22 (see FIG. 7 described later) connecting the connection portions. In the rib portion 22, carbon fibers are oriented in a major axis direction, and hence, the thermal expansion characteristics of the carbon fibers are dominant and the rib portion 22 generally contracts due to an increase in temperature. On the other hand, in the crossing portion 21, carbon fibers are oriented in various directions. Therefore, the crossing portion 21 is not influenced by the thermal expansion characteristics of carbon fibers, and the thermal expansion characteristics of a matrix resin that is a resin material connecting the carbon fibers are dominant and the crossing portion 21 generally expands due to an increase in temperature.

The presence/absence of a gap at the center of the connection portions 23, 24, and 25 and the size of the gap influence the size of the crossing portion 21 and change a configuration ratio of the rib portion 22 and the crossing portion 21. Therefore, the presence/absence of a gap and the size of the gap also significantly influence the thermal expansion characteristics of the entire cylindrical advanced grid structure of the third embodiment. In the third embodiment, there is no gap at the center of the connection portions, but an optimum value varies depending upon the presence/absence of a gap at the center of the connection portions, the size of the gap, the tensile elasticity modulus of carbon fibers, the elasticity modulus of the matrix resin, and the like, and it is necessary to obtain an optimum value in accordance with a constituent material and the like. In the case of the third embodiment, no gap is formed at the center of the connection portions 23, 24, and 25, and the influence of the rib portion 22 is more conspicuous than that of the crossing portion 21, and thus, thermal expansion involved in an increase in temperature can be reduced.

Figure 7:
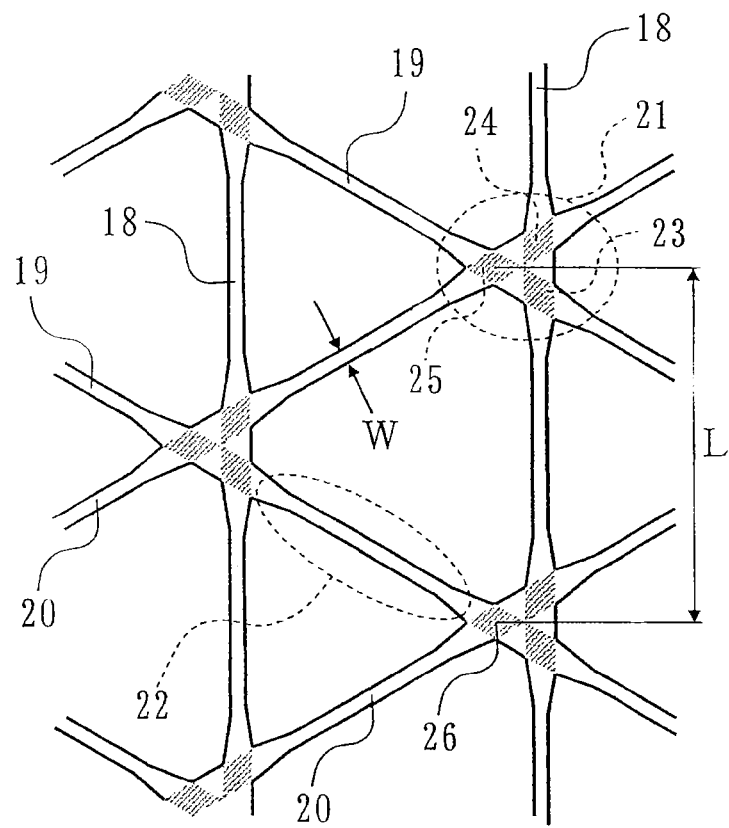
FIG. 7 is an enlarged view of a plurality of crossing portions of the cylindrical advanced grid structure according to the third embodiment of the present invention.

FIG. 7 is an enlarged view of a plurality of crossing portions 21 of the cylindrical advanced grid structure according to the third embodiment of the present invention. The crossing portion 21 is formed of three connection portions 23, 24, and 25. A value obtained by dividing a width W of the rib portion 22 connecting the respective connection portions by a distance L between one connection portion 25 of the second columnar structural member 19 and the third columnar structural member 20 and another connection portion 26 closest to the one connection portion 25 is defined as a structure ratio, and the structure ratio is used together with the inner diameter D of the cylindrical structure for evaluation as parameters showing the shape and configuration of the cylindrical advanced grid structure of the present invention.

Figure 8:
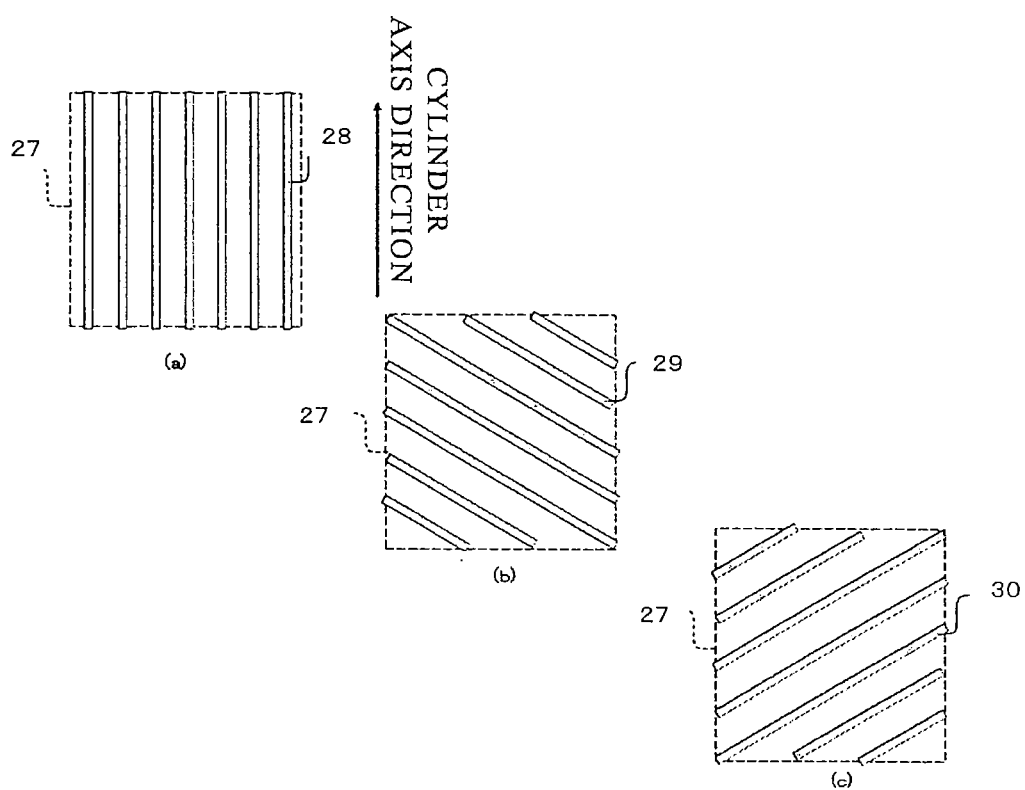
FIGS. 8A to 8C are plan views of three kinds of carbon fiber tape prepreg sheets to be used in the manufacture of the cylindrical advanced grid structure according to the third embodiment of the present invention.

A method of manufacturing the cylindrical advanced grid structure of the third embodiment is described with reference to FIGS. 8A to 8C. FIGS. 8A to 8C are plan views of three kinds of carbon fiber tape prepreg sheets used for manufacturing the cylindrical advanced grid structure according to the third embodiment of the present invention.

Carbon fiber tape prepregs 28, 29, 30 are attached to a release sheet 27 at a predetermined interval to form a carbon fiber tape prepreg sheet. The carbon fiber tape prepreg sheet is obtained by impregnating carbon fiber tapes in which fibers are oriented in a longitudinal direction of the tape with an epoxy resin, arranging and attaching the carbon fiber tapes on the release sheet 27 at a predetermined interval, and drying the carbon fiber tapes at high temperature to semi-cure the tapes.

FIG. 8A illustrates a tape prepreg sheet in which a carbon fiber axis is oriented in a cylinder axis direction. FIG. 8B illustrates a tape prepreg sheet in which a carbon fiber axis is oriented in a direction rotated by 60° in a counterclockwise direction from the cylinder axis direction. FIG. 8C illustrates a tape prepreg sheet in which a carbon fiber axis is oriented in a direction rotated by 60° in a clockwise direction from the cylinder axis direction.

The tape prepreg sheets illustrated in FIGS. 8A, 8B, and 8C are laminated successively in accordance with a cylindrical die having an outer diameter of 1,000 mm so that the cylinder axis direction becomes an arrow direction of the figures, and the release sheets 27 are peeled. Through repetition of this operation, a precursor of a cylindrical advanced grid structure with 30 layers of laminated prepregs in total, including 10 layers of each tape prepreg, is obtained. The number of laminated tape prepregs is not particularly limited and can be determined in view of the intended strength, weight, and the like.

A core for maintaining a space is attached so that the gap of an equilateral-triangular or hexagonal grid is not deformed, and heating is performed under pressure. In this manner, the cylindrical advanced grid structure having the inner diameter D of 1,000 mm is obtained.

The cylindrical advanced grid structure according to the third embodiment of the present invention is manufactured by a method of laminating prepregs obtained by impregnating carbon fibers with a resin and semi-curing the fibers, followed by curing the prepregs by heating. However, the method of manufacturing the cylindrical advanced grid structure of the present invention is not limited thereto. The cylindrical advanced grid structure can also be manufactured by a method of laminating only carbon fibers such as carbon fiber sheets to form a predetermined shape, and then impregnating the laminate with a resin solution and curing the laminate by heating.

The carbon fibers to be used in the cylindrical advanced grid structure according to the third embodiment of the present invention are not particularly limited, and carbon fibers which are generally available commercially can be used. Further, the kind of the resin is not particularly limited. Any resin such as an epoxy resin can be used as long as the thermal, mechanical, and chemical characteristics of the resin withstand the use environment.

A method of measuring a thermal expansion coefficient of the cylindrical advanced grid structure of the third embodiment and the measurement result are described with reference to FIGS. 9, 10, and 11 and Table 1.

Figure 9:
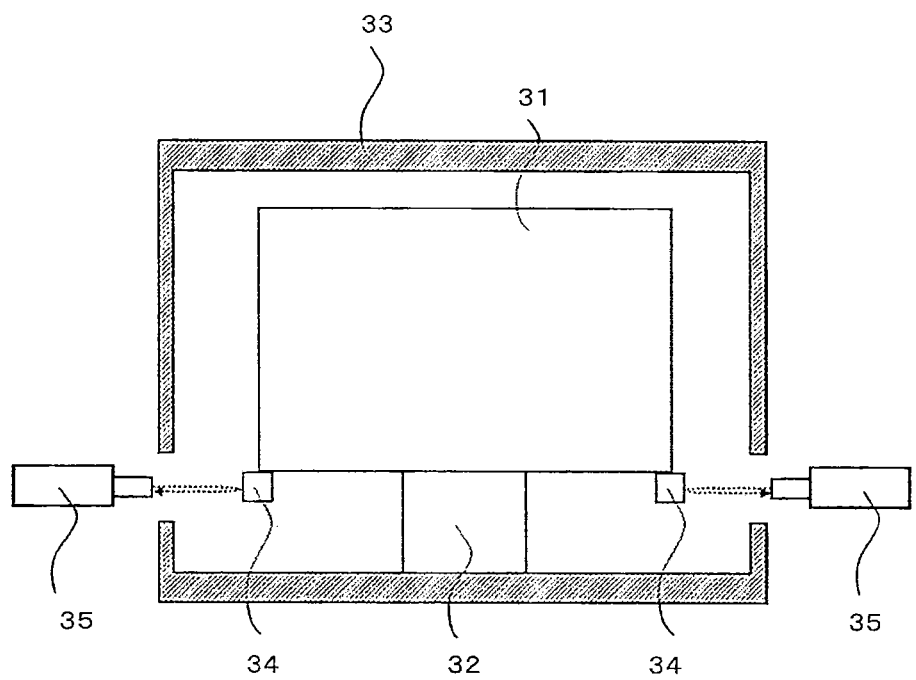
FIG. 9 is a cross-sectional view illustrating a device for measuring a thermal expansion coefficient of the cylindrical advanced grid structure according to the third embodiment of the present invention.

FIG. 9 is a cross-sectional view of a device for measuring a thermal expansion coefficient of the cylindrical advanced grid structure of the third embodiment. First, a grid cylindrical structure that is a measurement sample 31 is placed on a sample support platform 32 and fixed in a constant temperature oven 33. Then, while the temperature of the measurement sample 31 is changed by controlling the temperature in the constant temperature oven 33, laser mirror reflectors 34 attached to both ends of the measurement sample 31 are irradiated with a laser from a laser focus displacement gauge 35, and the reflected light is received to measure a displacement amount of the measurement sample 31 by heating, whereby a thermal expansion coefficient is calculated.

Samples of the cylindrical advanced grid structure manufactured in the third embodiment and used for evaluation, the structures thereof, and the like are described with reference to Table 1. Carbon fibers can be classified into a standard and intermediate elasticity modulus type (tensile elasticity modulus: 200 to 350 GPa), a high elasticity modulus type (tensile elasticity modulus: 350 to 600 GPa), and an ultra-high elasticity modulus type (tensile elasticity modulus: 600 to 950 GPa), depending upon a manufacturing method and a manufacturing material. The carbon fibers of similar types exhibit similar thermal and mechanical characteristics, and hence, in the third embodiment, carbon fibers are selected from each type of the carbon fibers to manufacture a sample of the cylindrical advanced grid structure.

Three kinds of carbon fibers: TORAYCA (trademark) carbon fibers T800HB (tensile elasticity modulus: 300 GPa) produced by Toray Industries, Inc. as the standard and intermediate elasticity modulus type; TORAYCA (trademark) carbon fibers M55J (tensile elasticity modulus: 540 GPa) produced by Toray Industries, Inc. as the high elasticity modulus type; and DIALEAD (trademark) carbon fibers K13C2U (tensile elasticity modulus: 900 GPa) produced by Mitsubishi Plastics, Inc. as the ultra-high elasticity modulus type, are used to manufacture cylindrical advanced grid structures, and cylindrical advanced grid structure samples using the respective cylindrical advanced grid structures are defined as Samples A, B, and C.

The inner diameters D of the cylindrical advanced grid structures of the third embodiment are all set to be 1,000 mm. Further, regarding each of Samples A, B, and C, the width W of the rib portion 22 and the distance L between the one connection portion 25 and the another closest connection portion 26 are set to have four patterns: (1) to (4) as shown in Table (the structure ratio of (2) is the same as that of (4), and hence, the structure ratio has three patterns).

Figure 10:
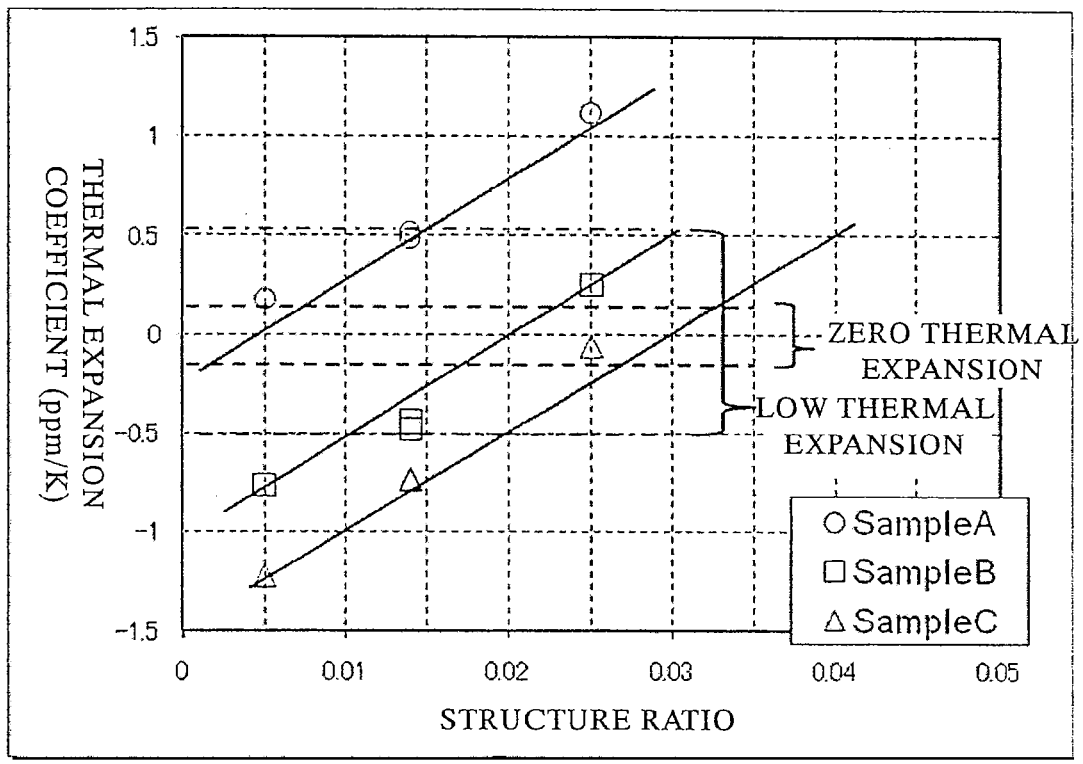
FIG. 10 is a graph showing structure ratio dependency of a thermal expansion coefficient in a cylinder axis direction of the cylindrical advanced grid structure (inner diameter D: 1,000 mm) according to the third embodiment of the present invention.

FIG. 10 is a graph showing structure ratio dependency of a thermal expansion coefficient in a cylinder axis direction of the cylindrical advanced grid structure (inner diameter D: 1,000 mm) of the third embodiment. It is understood that the thermal expansion coefficient of the cylindrical advanced grid structure becomes larger as carbon fibers having a smaller tensile elasticity modulus is used, and the cylindrical advanced grid structure contracts thermally when the tensile elasticity modulus of the carbon fibers is large. Further, it is understood that any cylindrical advanced grid structure has a large thermal expansion coefficient when a structure ratio is large and has a small thermal expansion coefficient when a structure ratio is small.

TABLE 1

| Sample | Inner diameter of cylinder (mm) | Tensile elasticity modulus of carbon fiber (GPa) | W/L (mm) = Structure ratio | Structure ratio/Tensile elasticity modulus ($\times 10^{-5}$ GPa$^{-1}$) | Thermal expansion coefficient (ppm/K) |
|---|---|---|---|---|---|
| A | 1000 | 300 | (1) 0.50/105 = 0.005 | 1.7 | 0.18 |
|   |      |     | (2) 1.46/105 = 0.014 | 4.7 | 0.49 |
|   |      |     | (3) 2.92/105 = 0.028 | 9.3 | 1.12 |
|   |      |     | (4) 2.92/210 = 0.014 | 4.7 | 0.52 |
| B |      | 540 | (1) | 0.9 | −0.76 |
|   |      |     | (2) | 2.6 | −0.48 |
|   |      |     | (3) | 5.2 | 0.25 |
|   |      |     | (4) | 2.6 | −0.44 |
| C |      | 900 | (1) | 0.6 | −1.22 |
|   |      |     | (2) | 1.6 | −0.73 |
|   |      |     | (3) | 3.1 | −0.06 |
|   |      |     | (4) | 1.6 | −0.73 |

The following is understood. A range sandwiched by alternate long and short dash lines in FIG. 10 exhibits low thermal expansion characteristics in a range of ±0.5 ppm/K that are excellent thermal expansion characteristics, which can be used in a mirror barrel for a space telescope. In Sample A using carbon fibers of the standard and intermediate elasticity modulus type having a tensile elasticity modulus of 200 to 350 GPa, it is necessary that a structure ratio be 0.015 or less. In Sample B using carbon fibers of the high elasticity modulus type having a tensile elasticity modulus of 350 to 600 GPa, it is necessary that a structure ratio be 0.01 to 0.035. In Sample C using carbon fibers of the ultra-high elasticity modulus type having a tensile elasticity modulus of 600 to 950 GPa, it is necessary that a structure ratio be 0.02 to 0.04.

The structure ratio is a value obtained by dividing the width W of the rib portion 22 by the distance L between the one connection portion 25 and the another closest connection portion 26, and the structure ratio and the thermal expansion coefficient have a linear relationship as shown in FIG. 10. On the other hand, in general, the tensile elasticity modulus and thermal expansion coefficient of carbon fibers are inversely proportional to each other. More specifically, when a value of the structure ratio of a grid cylindrical structure exhibiting low thermal expansion characteristics is divided by a tensile elasticity modulus of the corresponding carbon fibers (structure ratio/tensile elasticity modulus), a predetermined range in which low thermal expansion characteristics are obtained can be obtained regardless of the type of carbon fibers.

Figure 11:
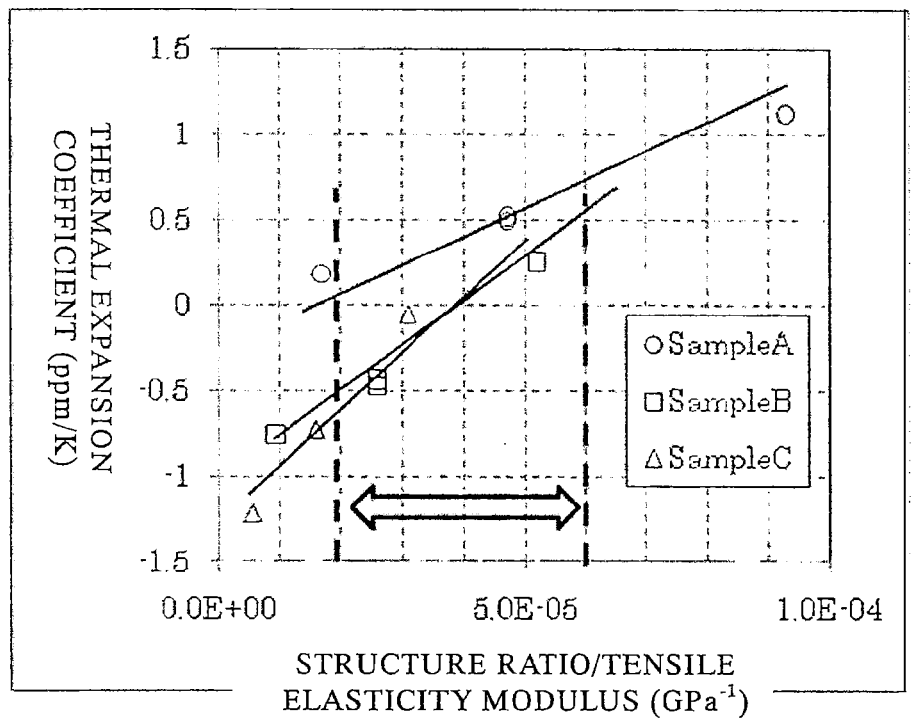
FIG. 11 is a graph showing structure ratio/tensile elasticity modulus dependency of a thermal expansion coefficient in a cylinder axis direction of the cylindrical advanced grid structure (inner diameter D: 1,000 mm) according to the third embodiment of the present invention.

FIG. 11 is a graph showing structure ratio/tensile elasticity modulus dependency of a thermal expansion coefficient in a cylinder axis direction of the cylindrical advanced grid structure (inner diameter D: 1,000 mm) according to the third embodiment of the present invention. Table 1 also shows a value of structure ratio/tensile elasticity modulus of each cylindrical advanced grid structure. The obtained range of a value of structure ratio/tensile elasticity modulus exhibiting low expansion characteristics is $2 \times 10^{-5}$ to $6 \times 10^{-5}$ (GPa$^{-1}$), and in this range, low thermal expansion characteristics of ±0.5 ppm/K that can be used in a mirror barrel for a space telescope regardless of the type of carbon fibers can be obtained.

A range sandwiched by broken lines in FIG. 10 is a region in which zero thermal expansion characteristics of ±0.10 ppm/K or less that are more excellent than the above-mentioned low thermal expansion characteristics can be obtained. In Sample A using carbon fibers of the standard and intermediate elasticity modulus type, zero thermal expansion characteristics can be obtained when a structure ratio is 0 to 0.007. In Sample B using carbon fibers of the high elasticity modulus type, zero thermal expansion characteristics can be obtained when a structure ratio is 0.017 to 0.023. In Sample C using carbon fibers of the ultra-high elasticity modulus type, zero thermal expansion characteristics can be obtained when a structure ratio is 0.026 to 0.032.

The cylindrical advanced grid structure of the third embodiment is formed only of the crossing portion 21, which is formed of the three connection portions 23, 24, and 25 close to each other, and the rib portion 22, and hence, the weight of the cylindrical advanced grid structure of the third embodiment can be reduced to ½ or less of that of a conventional cylindrical structure obtained by laminating and curing a prepreg sheet of uniaxially oriented carbon fibers, and the low thermal expansion characteristics and the reduction in weight can be achieved simultaneously.

Fourth Embodiment

A cylindrical advanced grid structure is manufactured by a method similar to that of the third embodiment. Carbon fibers of the high elasticity modulus type (TORAYCA carbon fibers M55J produced by Toray Industries, Inc.; tensile elasticity modulus: 540 GPa) and a matrix resin made of an epoxy resin are used for the cylindrical advanced grid structure of the fourth embodiment. A structure ratio is set to be 0.028 (2.92/105), and regarding the inner diameter D of a cylinder, 5 patterns: 600 mm, 1,000 mm, 1,500 mm, 2,000 mm, and a flat plate (curvature (radius$^{-1}$) is 0.0033, 0.002, 0.0013, 0.001, and 0/mm, respectively) are produced.

Figure 12:
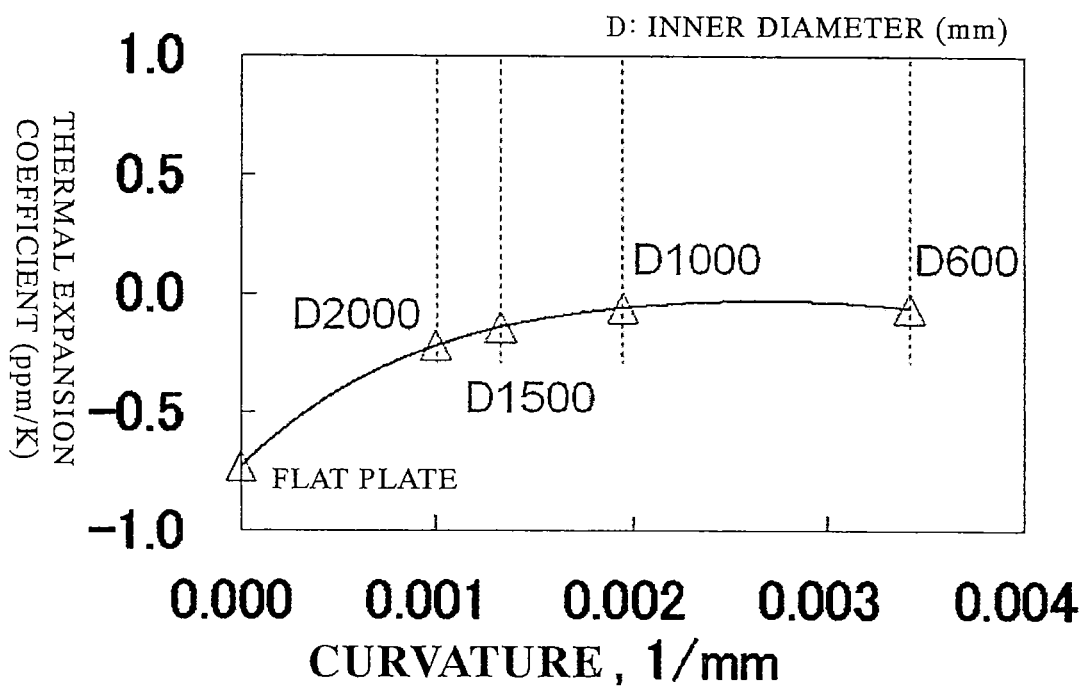
FIG. 12 is a graph showing curvature dependency of a thermal expansion coefficient in a cylinder axis direction of a cylindrical advanced grid structure (structure ratio: 0.028) according to a fourth embodiment of the present invention.

FIG. 12 is a graph showing curvature dependency of a thermal expansion coefficient in a cylinder axis direction of the cylindrical advanced grid structure (structure ratio: 0.028) according to the fourth embodiment. In the flat plate grid structure having a curvature of "0", which is not cylindrical, the thermal expansion coefficient is about −0.7 ppm/K, and thus, the thermal expansion coefficient cannot be considered to be sufficiently small. However, it is understood that, as the curvature increases (the inner diameter D of the cylinder decreases), the thermal expansion coefficient becomes ±0.5 ppm/K or less that is a range of the low thermal expansion characteristics in the cylinder axis direction, which can be used in a mirror barrel for a space telescope. More specifically, it is found that, when the grid structure is formed in an cylindrical shape, the thermal expansion coefficient can be set to be ±0.5 ppm/K or less by setting the inner diameter D to be 5,000 mm or less (curvature: 0.0004 or more) even under the condition of the same structure ratio and material as those of the flat plate grid structure. Further, when the inner diameter D is set to be 2,000 mm or less (curvature: 0.001 or more), very excellent low thermal expansion characteristics of ±0.2 ppm/K or less can be obtained.

The cylindrical advanced grid structure of the fourth embodiment is formed only of the crossing portion 21, which is formed of the three connection portions 23, 24, and 25 close to each other, and the rib portion 22, and hence, the weight of the cylindrical advanced grid structure of the fourth embodiment can be reduced to ½ or less of that of a conventional cylindrical structure obtained by laminating and curing a prepreg sheet of uniaxially oriented carbon fibers, and the low thermal expansion characteristics and the reduction in weight can be achieved simultaneously.

Fifth Embodiment

Figure 13:
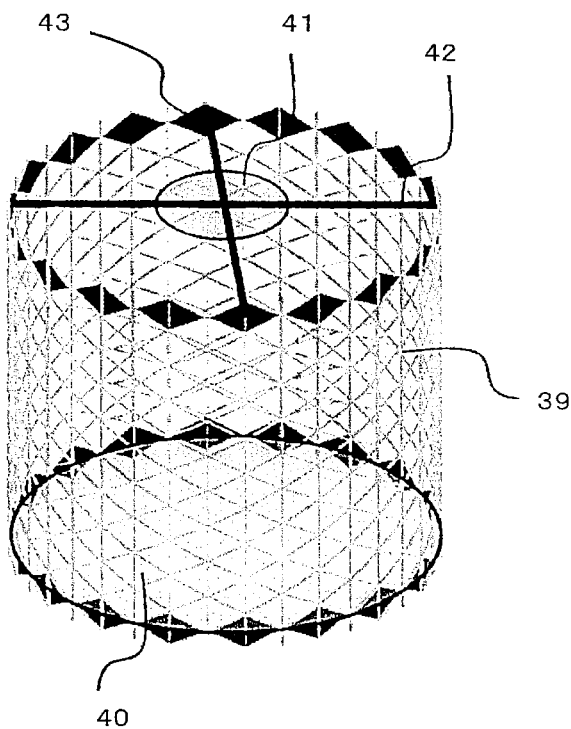
FIG. 13 is a perspective view of a space telescope according to a fifth embodiment of the present invention.

FIG. 13 is a perspective view of a space telescope according to a fifth embodiment of the present invention. The space telescope of the fifth embodiment has a configuration in which a cylindrical advanced grid structure 39 described in the third embodiment of the present invention is used as a mirror barrel, a primary mirror 40 is arranged at one end of the cylindrical advanced grid structure 39 and a secondary mirror 41 is arranged at the other end thereof so as to be opposed to each other, and an insert 43 that is a carbon fiber reinforced plastic plate for fixing a telescope member to the cylindrical advanced grid structure 39 and a secondary mirror support structure 42 that is a bar-shaped carbon fiber reinforced plastic for fixing the secondary mirror 41 are provided at the connection portions 23, 24, and 25 of the cylindrical advanced grid structure 39. The relative distance between the primary mirror 40 and the secondary mirror 41 is kept stably with respect to a change in temperature by the cylindrical advanced grid structure 39 having low thermal expansion characteristics, and hence, telescope characteristics are less changed by a change in temperature. Further, a light-weight space telescope can be obtained due to the use of the cylindrical advanced grid structure 39.

Sixth Embodiment

Figure 14:
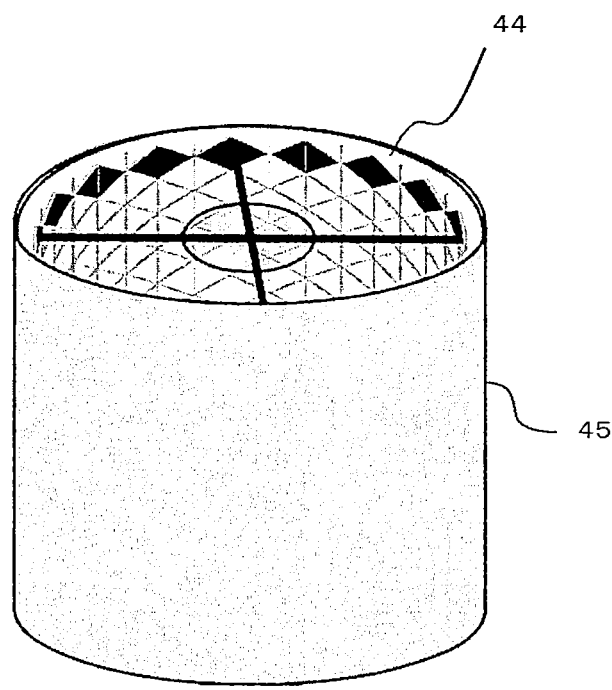
FIG. 14 is a perspective view of a space telescope having a light-shielding function according to a sixth embodiment of the present invention.

FIG. 14 is a perspective view of a space telescope having a light-shielding function according to a sixth embodiment of the present invention. The space telescope having a light-shielding function of the sixth embodiment has a configuration in which a carbon fiber reinforced plastic cylinder 45 for light shielding is mounted to the circumference of a space telescope 44 having the primary mirror 40, the secondary mirror 41, the insert 43, and the secondary mirror support structure 42 in the cylindrical advanced grid structure 39 described in the fifth embodiment.

Figure 15:
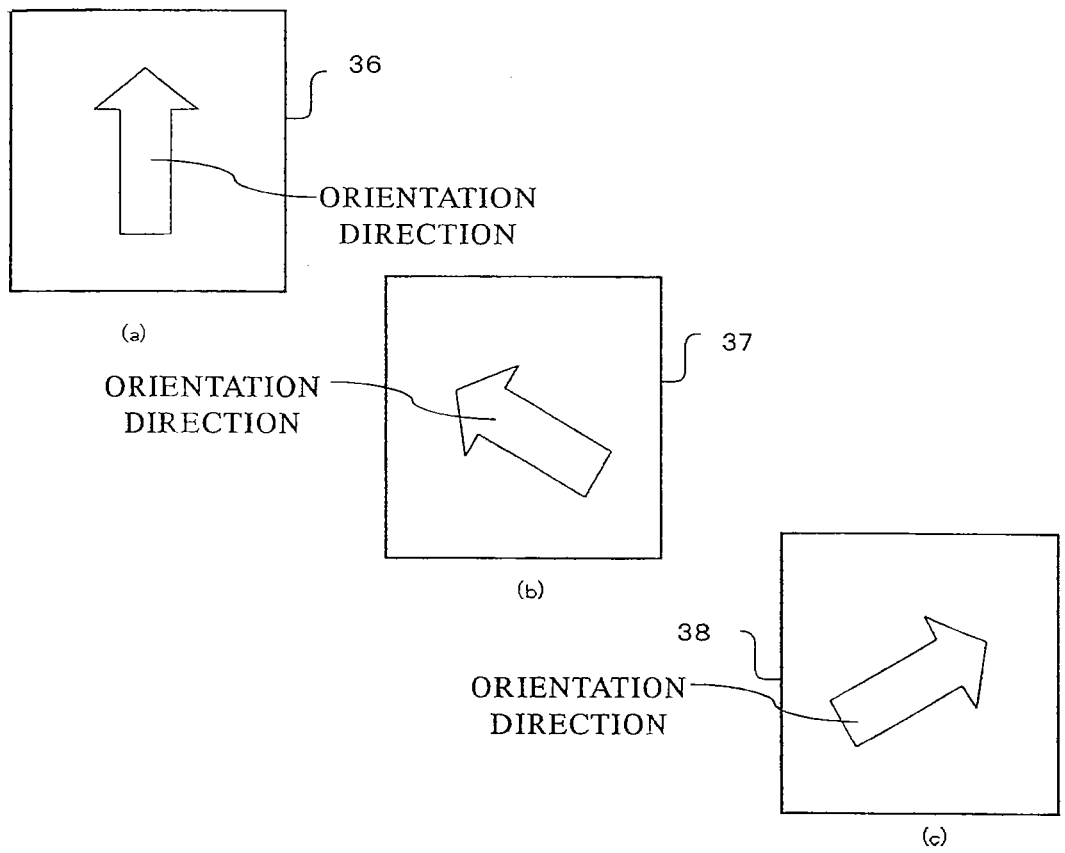
FIGS. 15A to 15C are plan views of three kinds of carbon fiber prepreg sheets for creating a carbon fiber reinforced plastic cylinder according to the sixth embodiment of the present invention.

A method of manufacturing the carbon fiber reinforced plastic cylinder 45 is described with reference to FIGS. 15A to 15C. FIGS. 15A to 15C are plan views of three kinds of carbon fiber prepreg sheets 36, 37, and 38 for manufacturing the carbon fiber reinforced plastic cylinder 45 of the sixth embodiment.

The carbon fiber prepreg sheets are each obtained by impregnating a carbon fiber sheet of uniaxially oriented carbon fibers with an epoxy resin and drying the carbon fiber sheet by heating to semi-cure the epoxy resin. FIG. 15A illustrates the carbon fiber prepreg sheet in which carbon fibers are oriented in a vertical direction. FIG. 15B illustrates the carbon fiber prepreg sheet in which the carbon fibers are oriented in a direction rotated by 60° in a counterclockwise direction from the vertical direction. FIG. 15C illustrates the carbon fiber prepreg sheet in which the carbon fibers are oriented in a direction rotated by 60° in a clockwise direction from the vertical direction.

The thirty carbon fiber prepreg sheets in total are laminated in the order of the sheet of FIG. 15A, the sheet of FIG. 15B, and the sheet of FIG. 15C ten times each while the directions illustrated in FIGS. 15A to 15C are kept, and the laminate is formed into a cylindrical shape with the vertical direction of the figures being a longitudinal direction. After that, the resultant laminate is pressurized and heated to obtain the carbon fiber reinforced plastic cylinder 45.

The inner diameter D of the cylindrical advanced grid structure 39 of the space telescope 44 used in the sixth embodiment is 1,500 mm, and the inner diameter D of the carbon fiber reinforced plastic cylinder 45 is 1,520 mm. Further, in the carbon fiber reinforced plastic cylinder 45, carbon fibers of the high elasticity modulus type (TORAYCA carbon fibers M55J produced by Toray Industries, Inc.; tensile elasticity modulus: 540 GPa) are used.

As illustrated in FIG. 14, the carbon fiber reinforced plastic cylinder 45 thus manufactured is mounted to the circumference of the space telescope 44 using the cylindrical advanced grid structure to obtain the space telescope having a light-shielding function of the sixth embodiment.

The telescope characteristics of the space telescope 44 portion are less changed by a change in temperature because the relative distance between the primary mirror 40 and the secondary mirror 41 is kept stably with respect to a change in temperature by the cylindrical advanced grid structure 39 having low thermal expansion characteristics. Further, a light-weight space telescope can be obtained due to the use of the cylindrical advanced grid structure 39. Further, in the sixth embodiment, the carbon fiber reinforced plastic cylinder 45 is mounted to the circumference of the space telescope 44, and hence, the space telescope 44 has low thermal expansion and does not receive light from outside, which enables an object to be observed with higher accuracy.

The carbon fibers used in the carbon fiber reinforced plastic cylinder 45 are not particularly limited, and carbon fibers which are generally available commercially can be used. The kind of the resin with which the carbon fiber sheet is impregnated is not limited to an epoxy resin, and any resin can be used as long as the thermal, mechanical, and chemical characteristics of the resin withstand the use environment. Further, the number of laminated prepreg sheets is not particularly limited and can be determined in view of the intended strength, weight, and the like.

The inner diameter D of the carbon fiber reinforced plastic cylinder 45 is not particularly limited and can be changed in accordance with the inner diameter D of the space telescope 44 provided in the carbon fiber reinforced plastic cylinder 45. Note that, the inner diameter D of the carbon fiber reinforced plastic cylinder 45 is preferably 2,000 mm or less in order to obtain low thermal expansion characteristics stably.

In the third to sixth embodiments, the cases are shown in which only carbon fibers having substantially the same tensile elasticity modulus are used in the advanced grid structure and the carbon fiber reinforced plastic cylinder having the same cylindrical shape. However, similar effects can be obtained even when carbon fibers having significantly different tensile elasticity modulus are mixed and used simultaneously. The effects of the thermal expansion characteristics and the reduction in weight vary depending upon the value, distribution, and the like of a tensile elasticity modulus of the carbon fibers. Therefore, a cylindrical advanced grid structure having more excellent characteristics can be obtained by selecting a value, distribution, and the like of the tensile elasticity modulus of the carbon fibers in accordance with the intended characteristics of the cylindrical advanced grid structure and the like.

In the above-mentioned embodiments, the case where the grooves in three directions have an angle of 0°, +60°, and −60° (corresponding to the case where the shape of a core for forming grooves has an equilateral-triangular shape) is described. However, the present invention is not limited to such a case. As long as the grooves in three directions are formed at different angles, both the size dimension and the uniformity of the amount of carbon fibers in the thickness direction can be ensured within desired ranges.

More specifically, as long as the effect of ensuring the uniformity of the amount of carbon fibers in the thickness direction can be realized by laminating each tape prepreg as one layer so that the tape width is maintained in a crossing region and laminating each tape prepreg so that the tape prepreg is folded as two layers in the width direction in a non-crossing region, the angles in three directions may be other than the direction parallel to the cylinder axis direction and the directions at ±60° with respect to the cylinder axis direction.

Further, in the above-mentioned embodiments, the case where the tape width obtained by folding a tape prepreg to be laminated as two layers is set to be a half of the width of a band-shaped tape prepreg is described. However, the present invention is not limited to such a case. Even in the case where a part of a tape prepreg is laminated as two layers so as to have a width larger than a half of the width of a band-shaped tape prepreg, the uniformity of the amount of carbon fibers in the thickness direction can be improved as compared to the conventional case.

Each embodiment of the present invention can be combined freely or appropriately modified or omitted within the scope of the present invention.

What is claimed is:

1. An advanced grid structure made of a fiber reinforced resin, the advanced grid structure comprising:
    a plurality of tape groups each including reinforced fibers extending in a longitudinal direction thereof, the plurality of tape groups overlapping each other into a lattice shape, the plurality of tape groups comprising a first tape group, a second tape group, and a third tape group extending in different longitudinal directions, the first tape group, the second tape group, and the third tape group being laminated in an overlapping manner repeatedly to form a grid;
    crossing regions, in each of which two tape groups overlap each other;
    a lattice formed so that the crossing regions formed of two different tape groups are brought into contact with each other; and
    non-crossing regions each provided between the crossing regions, in which one tape group is laminated without overlapping another tape group, and a tape is folded in a thickness direction to be laminated so that a thickness obtained by overlapping the two tape groups in each of the crossing regions is equal to a thickness obtained by folding one tape in each of the non-crossing regions.

2. An advanced grid structure according to claim 1, further comprising a tapered region provided between the each of the crossing regions and the each of the non-crossing regions, in which a tape width changes continuously in a tapered shape.

3. An advanced grid structure according to claim 1, wherein a tape width obtained by folding and laminating the one tape in the each of the non-crossing regions is a half of a tape width in the each of the crossing regions.

4. An advanced grid structure according to claim 1, wherein the lattice is formed so as to form a cylinder, and wherein the first tape group is parallel to a center axis of the cylinder, the second tape group crosses the first tape group at an angle of +60°, and the third tape group crosses the first tape group at an angle of −60°.

5. An advanced grid structure according to claim 1, wherein when the each of the crossing regions is a connection portion and the each of the non-crossing regions connecting the connection portions is a rib portion, when a value obtained by dividing a width of the rib portion by an interval between closest connection portions is defined as a structure ratio, and when carbon fibers are applied as the reinforced fibers, the structure ratio is more than 0 and 0.015 or less, and a tensile elasticity modulus of the carbon fibers included in the first tape group, the second tape group, and the third tape group is 200 GPa or more and 350 GPa or less.

6. An advanced grid structure according to claim 1, wherein when the each of the crossing regions is a connection portion d the each of the non-crossing regions connecting the connection portions is a rib portion, when a value obtained by dividing a width of the rib portion by an interval between closest connection portions is defined as a structure ratio, and when carbon fibers are applied as the reinforced fibers, the structure ratio is 0.01 or more and 0.035 or less, and a tensile elasticity modulus of the carbon fibers included in the first tape group, the second tape group, and the third tape group is 350 GPa or more and 600 GPa or less.

7. An advanced grid structure according to claim 1, wherein when the each of the crossing regions is a connection portion and the each of the non-crossing regions connecting the connection portions is a rib portion, when a value obtained by dividing a width of the rib portion by an interval between closest connection portions is defined as a structure ratio, and when carbon fibers are applied as the reinforced fibers, the structure ratio is 0.02 or more and 0.04 or less, and a tensile elasticity modulus of the carbon fibers included in the first tape group, the second tape group, and the third tape group is 600 GPa or more and 950 GPa or less.

8. An advanced grid structure according to claim 1, wherein when the each of the crossing regions is a connection portion and the each of the non-crossing regions connecting the connection portions is a rib portion, when a value obtained by dividing a width of the rib portion by an interval between closest connection portions is defined as a structure ratio, and when carbon fibers are applied as the reinforced fibers, a value obtained by dividing the structure ratio by a tensile elasticity modulus of the carbon fibers included in the first tape group, the second tape group, and the third tape group is $2\times10^{-5}$ to $6\times10^{-5}$ $(GPa^{-1})$.

9. A space telescope using an advanced grid structure, comprising:
    a mirror barrel formed of the advanced grid structure according to claim 5;
    a primary mirror fixed to the connection portion in one end part of the advanced grid structure; and
    a secondary mirror fixed to the connection portion in another end part of the advanced grid structure so as to be opposed to the primary mirror,
    wherein a relative distance between the primary mirror and the secondary mirror is stably maintained by the mirror barrel.

10. A space telescope using an advanced grid structure according to claim 9, further comprising a carbon fiber reinforced plastic cylinder provided on a periphery of the mirror barrel.

* * * * *